No. 834,870. PATENTED OCT. 30, 1906.
J. C. CHAMBERLAIN & A. T. MARSHALL.
AUTOMATIC CONTROLLING MEANS FOR FLUID PRESSURE SYSTEMS.
APPLICATION FILED JUNE 21, 1905.
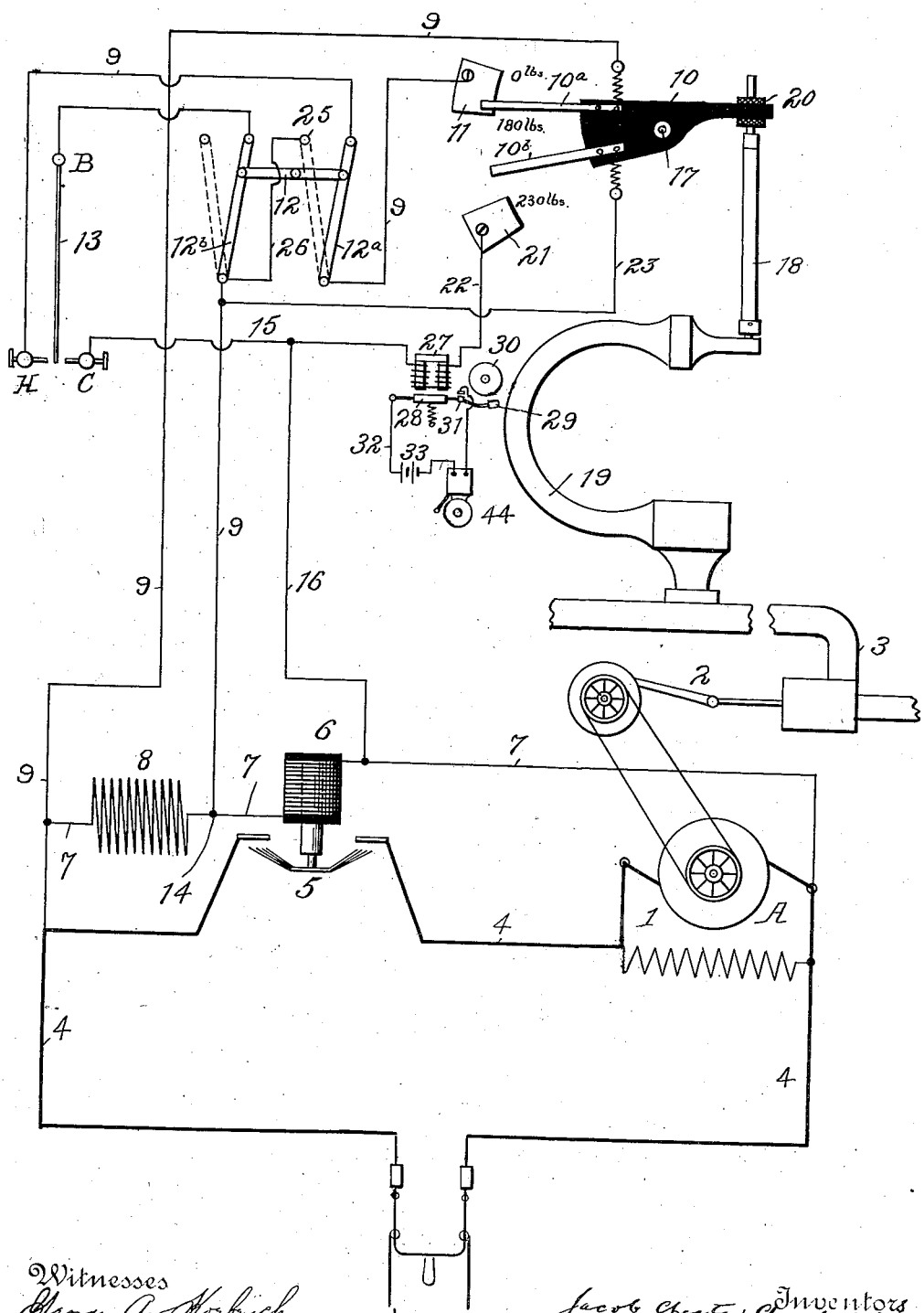

UNITED STATES PATENT OFFICE.

JACOB CHESTER CHAMBERLAIN, OF NEW YORK, AND ALBERT T. MARSHALL, OF NEW ROCHELLE, NEW YORK, ASSIGNORS, BY DIRECT AND MESNE ASSIGNMENTS, TO THE AUTOMATIC REFRIGERATING COMPANY, OF NEW YORK, N. Y., A CORPORATION OF NEW JERSEY.

AUTOMATIC CONTROLLING MEANS FOR FLUID-PRESSURE SYSTEMS.

No. 834,870. Specification of Letters Patent. Patented Oct. 30, 1906.

Application filed June 21, 1905. Serial No. 266,358.

*To all whom it may concern:*

Be it known that we, JACOB CHESTER CHAMBERLAIN, residing in the city of New York, and ALBERT T. MARSHALL, residing at New Rochelle, Westchester county, State of New York, have invented certain new and useful Improvements in Automatic Controlling Means for Fluid-Pressure Systems, of which the following is a specification.

The invention relates, primarily, to automatic controlling devices for fluid-pressure systems—for example, refrigerating systems, either gas or liquid—and has for its object to provide automatically - acting controlling means for protecting such systems from abnormal or dangerous pressure.

A further object of the invention is to provide controlling means of the character mentioned which shall not only protect a system from injury upon the occurrence of abnormal or dangerous conditions therein, but which shall also automatically restore the system to operation upon the subsidence or disappearance of the abnormal or dangerous condition.

A further object of the invention consists in the combination of the above-mentioned controlling means with the usual or normal controlling means—for example, in refrigerating systems the thermostatic controlling means—and also the provision of devices whereby the first controlling means may be operated in conjunction with or independently of the normal thermostatic or other controlling devices, as desired.

A further object of the invention is to provide means whereby systems of the above character may be automatically controlled by the normal thermostatic or other controlling devices as long as the pressure of the refrigerant or other fluid medium remains within predetermined limits, but upon said pressure exceeding the predetermined limit and attaining a dangerous limit automatically to cut out the normal or thermostatic control and cause the system to be controlled only by the means for preventing the occurrence of abnormal or dangerous pressure of the refrigerating or other fluid medium and, further, when the pressure has dropped to within the predetermined limit to restore automatically the system to the normal or thermostatic control.

These and other objects of the invention, with means by which same may be realized, are duly set forth in the following specification and the novel features thereof particularly pointed out in the claims.

In the annexed drawing we have illustrated diagrammatically an embodiment of our invention as applied to a refrigerating system, showing only so much of such system as is necessary to an understanding of the invention.

1 is a motor or other driving means for driving a pump 2 for causing circulation of the refrigerant. Connected to the pump is the conduit 3, through which said medium flows, it being understood that the refrigerant circulates through the refrigerating-chamber, (not shown,) is then cooled and returned to the circuit by the pump 2, the cooling being effected in a suitable cooling-chamber (not shown) by means of circulating water, as is usual in systems of this character.

The motor is driven by current supplied through mains 4. Included in the mains leading to the motor is a circuit-closer 5, which is operated by a solenoid 6, the solenoid being included in a circuit 7 in shunt to the mains. Included in the circuit 7 is a resistance 8 of any suitable or convenient form of such a character that when said resistance is in series with the solenoid the relative resistances of said resistance and the solenoid are such that the solenoid will not be sufficiently energized to operate the circuit-closer 5. A branch circuit 9 leads from the mains to and through a switch 10, contact-piece 11, blade 12ª of switch 12, to the contact H.

Arranged to make contact with the contact H is a thermostat-arm 13, so that when contact is made at H circuit 9 continues through the blade 12ᵇ of the switch 12 to and through the solenoid 6 and branch 7, thereby short - circuiting resistance 8. Upon the closing of this circuit 9 at contact H solenoid 6 will receive sufficient current to energize the same and operate the circuit-closer 5, closing the main circuit 4 through the motor, thus starting the motor and pump. The thermostat-arm 13 moves to contact H and closes the circuit above described when the temperature in the refrigerating-chamber rises beyond the proper limit. If after starting of the motor, as above described, the temperature in the refrigerating-chamber falls within the proper limit, circuit 9 will be opened at the contact H, but the motor will continue to operate, since the resistance at 8 is so designed as to permit sufficient current to circulate through the solenoid 6 to hold the circuit-closer 5 closed. If, however, the temperature in the refrigerating-chamber should fall below the limit desired, thermostat-arm 13 will move over to contact C. A circuit will then be established from the mains through resistance 8, branch 9, switch-blade 12$^b$, thermostat-arm 13, contact C, connections 15 16, back to the mains. It will be seen that upon closing this circuit solenoid 6 is short-circuited and deënergized, whereupon the circuit through the motor is opened by the opening of circuit-closer 5. The motor is therefore stopped, stopping the supply of refrigerating medium to the refrigerating-chamber until the temperature in the said chamber rises within the proper limit, whereupon the motor and pump will again be started automatically by the action of thermostat-arm 13, closing the motor-circuit by cutting out resistance 8 and energizing solenoid 6, as before described.

In connection with the above-described system we employ an automatic device for cutting out or stopping the motor when the pressure in the circulating-conduit 3 rises above a predetermined limit. It sometimes happens that owing to a diminution or stoppage of the water-supply for cooling and condensing the refrigerant a dangerous pressure may arise in the circulating-conduit. This dangerous pressure is likely to rise so high as to cause serious injury to the system. Furthermore the rise in pressure causes a rise in temperature, and in systems subject to thermostatic control the rise in temperature causes the pump to operate, and thereby the already-increased pressure is further increased and rapidly reaches a dangerous point. To prevent such a result, we have provided an automatically-operated device for cutting out the thermostatic control of the system and also for stopping the motor when such dangerous conditions arise. Said automatic device also acts automatically to restore the system to its normal operation and to thermostatic control when the dangerous pressure in the circulating-conduit subsides or ceases. This device comprises a switch 10, which is responsive to the pressure in the circulating-conduit. Said switch is pivotally mounted at 17 and has connection through the rod 18 with the pressure-tube or equivalent device 19 of a pressure-gage inserted in the conduit 3. Suitable adjusting-screws 20 are provided, so that the throw of the switch 10 may be properly adjusted. The body of switch 10 is made of insulating material and is provided with two blades of conducting material 10$^a$ and 10$^b$, the plate 10$^a$ being arranged to make contact with the contact-piece 11, as before described, and the plate 10$^b$ arranged to make contact with a contact-piece 21. Contact-piece 11 is of such extent that blade 10$^a$ will remain in contact therewith while the pressure in circulating-conduit 3 is within certain limits—say from zero to one hundred and eighty pounds. Contact-piece 21 is arranged at such distance from contact 11 that blade 10$^b$ will make contact therewith when the pressure in the circulating-conduit has reached a dangerous limit—say two hundred and thirty pounds. The space between the contact-pieces 11 and 21 is such that blade 10$^a$ will pass off contact 11 before blade 10$^b$ makes contact with contact 21. Contact 21 is electrically connected through connections 22 and 16 with the connection 7, and the switch-plate 10$^b$ is electrically connected through connection 23 to the circuit 9, as shown.

The action of this device is as follows: Assuming that the system is operating normally, with the thermostat-arm 13 in neutral position and the resistance 8 and solenoid 6 in series with the circuit-closer 5 held in closed position, as above described, upon an increase of pressure in the circulating-conduit 3 beyond the predetermined limit—say one hundred and eighty pounds—switch 10 will be moved by the pressure device 19 to carry its blade 10$^a$ away from the contact-plate 11, thus opening the circuit 9 through the thermostat-arm 13 at this point and cutting out the thermostatic control of the system, except that if the motor be at the moment in operation a drop in temperature will cause the stoppage of the motor, the current in that event going through the path 8, 9, 12$^b$, B, 13, C, 15, 16, and 7. Upon the pressure continuing to rise and reaching a dangerous limit switch 10 will be moved to make contact with contact 21. This short-circuits solenoid 6, the current flowing through resistance 8, connection 9, connection 23, switch-blade 10$^b$, contact 21, electromagnet 27, (if such an electromagnet is used, as hereinafter described,) connections 22, 16, 7, to the negative side of the mains. The solenoid 6 being thus deënergized, circuit-closer 5 opens and the motor is stopped.

Upon the resumption of the proper supply of water to the refrigerating-chamber the pressure in conduit 3 returns to normal, and switch 10 is returned to make contact with contact 11, whereupon the system is restored to control of the thermostat-arm 13.

The system may be operated independently of the thermostatic controlling means by throwing switch 12 on to contact 25, as shown in dotted lines. This throws in a branch 26 and cuts out the portion of circuit 9 including the thermostat-arm 13. Switch 12 may be used as a stopping and starting switch for the whole system. When in middle position, both controlling devices are cut out, except that if the motor be at the moment in operation it will be stopped by the pressure-controller if the pressure reaches two hundred and thirty pounds. When thrown to the right, the system is controlled by both controlling devices and when thrown to the left by the pressure sensitive device only. In the last-mentioned position the temperature of refrigeration may be controlled by an ordinary hand-operated switch for throwing the motor in or out of circuit or by moving switch 12 itself between its left-hand and central positions.

We may arrange to give visual or audible signal of the occurrence of abnormal pressure in the circulating system: For example, we may arrange in the branch circuit 22 that means controlled by the energizing of that circuit for ringing one or more bells placed at desired positions. As shown in the present illustrative diagram, this alarm mechanism has the coils of an electromagnet 27 of low resistance, lower than that of solenoid 6, included in circuit 22 and controlling a spring retracted armature 28, bearing the hammer 29 of a gong 30, adapted to give a single blow for each closure of the circuit at 10$^b$ 21. This gong may be located adjacent to the refrigerating-chamber to give notice to the attendant in charge of the changed condition of pressure. The rising of the armature 28 may also close at 31 a local circuit 32, including a battery 33 and bell 34, adapted to give a signal whose duration is coextensive with the existence of abnormal pressure. This continuous-alarm bell, as well as the gong, may be placed, if desired, at some place remote from the refrigerating-chamber to give at such point notice of the presence of abnormal pressure. Either of these alarm devices may be used to the exclusion of the other, or they may, as shown, be employed together.

We have described our invention as applied to refrigerating systems of the character described. Such description, however, is merely by way of illustration and not a limitation.

Having thus described our invention, the following is what we claim as new and desire to secure by Letters Patent:

1. In a system of the character described, the combination of a fluid-circulating conduit, a pump for circulating fluid therein, automatic means responsive to conditions exterior to the conduit of controlling the operation of said pump under normal conditions in the fluid-circulating conduit, means responsive to the pressure in the conduit for stopping the pump under abnormal conditions of pressure and for restoring the control of the pump to the normal controlling means on return of pressure in the conduit to normal.

2. In a system of the character described, the combination of a pump for circulating a refrigerant, a conduit for the refrigerant connected to the pump, means for controlling the operation of the pump to maintain the refrigerating temperature substantially constant, and means responsive to pressure in the conduit automatically to throw the pump out of operation when said pressure exceeds a predetermined limit and automatically to throw the pump-controlling means into operative condition when said pressure returns to a predetermined limit.

3. In a system of the character described, the combination with means to circulate a refrigerating medium, and a device responsive to temperature for automatically throwing into and out of operation the said circulating means upon increase or decrease of temperature in the refrigerating-chamber beyond a predetermined limit, of a device responsive to the pressure of the refrigerating medium for throwing the circulating means out of operation when the pressure of the refrigerating medium exceeds a predetermined limit and automatically restoring the normal control of the circulating means when said pressure returns to a predetermined limit.

4. In a system of the character described, the combination of a pump, a refrigerating-conduit connected to the pump, means responsive to the refrigerating temperature for controlling the operation of the pump, means responsive to the pressure in the refrigerating-conduit for controlling the operation of the pump, and means for causing the pressure-responsive-controlling means to coact with the temperature - responsive - controlling means or to operate independently thereof as desired.

5. In a system of the character described, the combination of means to circulate a refrigerant, means responsive to the refrigerating temperature for controlling the circulating means, and means responsive to the pressure of the refrigerant for controlling the circulating means, and means for causing the pressure-responsive means to coact with the temperature-responsive means or to act independently thereof.

6. In a system of the character described, the combination of a conduit for a refrigerant, means to circulate the refrigerant through the conduit, means responsive to the refrigerating temperature automatically to control the operation of the circulating means, means responsive to the pressure in the conduit to control the operation of the circulating means, and means for automatically throwing the temperature - responsive - controlling means out of operative condition upon the pressure in the conduit exceeding a predetermined limit and automatically restoring the temperature-responsive-controlling device to operative condition upon said pressure returning to a predetermined limit.

7. In a system of the character described, the combination of a pump for circulating a refrigerant, a motor for driving the pump, an electromagnet controlling the motor-circuit, a device responsive to the refrigerating temperature, and a device responsive to the pressure of the refrigerant each of said devices controlling the operation of the electromagnet to cause the same to open and close the motor-circuit upon the temperature or pressure departing from predetermined limits.

8. In a system of the character described, the combination of a motor for causing circulation of a refrigerant, an electromagnet for controlling the motor-circuit, a device responsive to the refrigerating temperature, and a device responsive to the pressure of the refrigerant each of said devices controlling the operation of the electromagnet to open and close the motor-circuit, the control of the temperature-responsive device being dependent upon the pressure-responsive device.

9. In a system of the character described, the combination of a motor for causing circulation of a refrigerant, an electromagnet for opening and closing the motor-circuit, a device responsive to the refrigerating temperature and a device responsive to the pressure of the refrigerant, each of said devices automatically controlling the operation of the electromagnet, and means for throwing the temperature-responsive device out of action without affecting the controlling action of the pressure-responsive device.

10. In a system of the character described, the combination of a motor for causing circulation of a refrigerant, an electromagnet for opening and closing the motor-circuit, a device responsive to the pressure of the refrigerant controlling the operation of the electromagnet, a device responsive to the refrigerating temperature for controlling the operation of the electromagnet, said temperature-responsive device controlled by the pressure-responsive device whereby the temperature-responsive device is automatically thrown out of operation upon the said pressure exceeding a predetermined limit and restored to operation when the said pressure falls to a predetermined limit.

11. In a system of the character described, the combination of a conduit for a refrigerant, a motor and pump for circulating a refrigerant in said conduit, an electromagnet for opening and closing the motor-circuit, a resistance controlling the operation of said magnet, a device responsive to the pressure of the refrigerant in said conduit, and controlling the circuit of the said resistance and magnet, and connections for short-circuiting the resistance when the said pressure is within a predetermined limit and short-circuiting the magnet when the said pressure reaches a point above said limit.

12. In a system of the character described, the combination of a fluid-pressure circuit, an electric circuit including an electric motor for causing the circulation of fluid in said fluid-pressure circuit, a motor-controlling circuit, means responsive to changes of pressure in said fluid-pressure circuit to stop the operation of said motor, a local circuit including a signaling device, and a controlling device for said local circuit responsive to the condition of the motor-controlling circuit.

JACOB CHESTER CHAMBERLAIN.
ALBERT T. MARSHALL.

Witnesses:
HARRY E. KNIGHT,
ELLEN HOUGH.